United States Patent [19]

Savage

[11] 4,420,948

[45] Dec. 20, 1983

[54] APPARATUS FOR DISPENSING HARD ICE CREAM AND THE LIKE

[76] Inventor: Don H. Savage, No. 2 Windsong, Sandy, Utah 84070

[21] Appl. No.: 243,124

[22] Filed: Mar. 12, 1981

[51] Int. Cl.$^3$ .................. B29C 1/00; A23G 3/18; A23G 9/28

[52] U.S. Cl. .................... 62/340; 425/150; 425/187; 425/276; 425/324.1; 425/547

[58] Field of Search .............. 425/376 R, 150, 187, 425/585, 586, 587, 581, 276, 278, 279, 280, 282, 324.1, 145, 146, 149; 62/340, 341, 344, 356

[56] References Cited

U.S. PATENT DOCUMENTS

| 252,711 | 1/1982 | Atkiss | 425/376 R |
|---|---|---|---|
| 1,801,578 | 4/1931 | Stevens | 425/145 |
| 2,201,403 | 5/1940 | Knaust | 425/150 |
| 2,558,887 | 7/1951 | Tesiero | 425/145 |
| 2,719,494 | 10/1955 | Spiess et al. | 425/586 |
| 3,590,750 | 7/1971 | Lamy | 425/279 |

Primary Examiner—Willard E. Hoag
Attorney, Agent, or Firm—Thorpe, North & Western

[57] ABSTRACT

A dispensing system for dispensing a wide variety of types and flavors of a solid food, such as ice cream, in spherical-shaped balls or scoops. The dispensing system is housed in a structure that provides a plurality of drawer-like compartments that are accessible from a front side thereof. The structure may advantageously comprise the walls of a freezer or refrigeration unit when the solid food to be dispensed must be maintained at a low temperature. Each compartment is loaded by sliding it out from its compartment and placing the food to be dispensed within a barrel or holding chamber thereof. Once loaded, the compartment is slid back into the housing structure. The back side of the barrel or holding chamber is open and aligned with a movable plunger that moves forward and maintains a constant pressure on the food contained herein. The plunger is controlled by a suitable pressure source, such as a pressurized air cylinder or hydraulic unit. The front side of the barrel or holding chamber tapers down to an exit port having a discharge tube connected thereto. The discharge tube protrudes through the front wall of the housing structure and is therefore accessible without having to open the drawer inside of which the compartment is located. The discharge tube has a hemispherical cap pivotally mounted at the protruding end thereof. This cap, when pivoted from a closed to an open position, carves out an approximately spherical-shaped ball or scoop of the desired food. A handle attached to the cap facilitates the rotation thereof. A push plate ejects the scoop or ball thus formed from the cap into a desired container for consumption.

35 Claims, 11 Drawing Figures

APPARATUS FOR DISPENSING HARD ICE CREAM AND THE LIKE

BACKGROUND OF THE INVENTION

This invention relates to food dispensers; and more particularly to a food dispenser for dispensing hard ice cream and the like in spherical-shaped balls.

A food typically extrudes, sprays, or feeds out a desired food substance in convenient units. Food dispensers generally fall into two broad categories: (1) liquid dispensers, and (2) solid dispensers. The term "solid" in the context of solid food dispensers refers to non-liquid dispensers. Typically, a solid food is not a pure solid, but rather is a semi-solid—that is a plyable substance that is not runny as a liquid might be. Thus, throughout this application where the term "solid" is employed, it is to be understood that it refers to a non-liquid substance (more correctly described as a semi-solid). Numerous food substances fall within this "solid" category, including mashed potatoes, butter, salads of various varieties (such as potatoe or macaroni salad), and, of course, hard ice cream, sherbert, and other solid sweets and desserts.

There are no prior art hard ice cream dispensers with which this inventor is familiar or has discovered. Indeed, hard ice cream has been dispensed in the same manner for over eighty years. Any person who has ever served hard ice cream is familiar with this method. It consists of removing the frozen ice cream from the freezer and scooping (or otherwise cutting or sawing) the ice cream into the container from which it is to be eaten. A convenient tool for scooping hard ice cream in this fashion is a "scoop". This is a hemispherical utensil that is constructed of rigid materials, having generally sharp edges, that can be physically forced into the hard ice cream so as to dig out a corresponding scoop-shaped portion of ice cream. Depending upon the hardness of the ice cream, significant manual forces may be needed in order to force the "scoop" into and through the ice cream. Some forms of ice cream scoops even include a special scraper (typically operated by the thumb or finger of the hand of the operator) for scraping the ice cream free from the scoop once it has been removed from the ice cream container.

There are numerous problems associated with the manual method of scooping or dispensing hard ice cream. These problems are particularly apparent for the commercial ice cream vendor who specializes in serving scoops of ice cream to his customers (either on a cone or in a dish) and who provides a wide variety of flavors from which his customers may choose. Such a vendor typically maintains at least one large horizontal freezer compartment inside of which the various flavors of ice cream are kept in their respective containers. When a customer desires a particular flavor of ice cream, the vendor must locate this flavor within his freezer compartment, open the door of the freezer (if the door is not already open), bend over and manually scoop the desired flavor of ice cream from its container onto the cone or other serving dish from which the customer will eat it. To aid in the scooping process, it is not uncommon for the vendor to maintain several manual scoops in warm water. Maintaining the scoops at an above-freezing temperature not only helps the scoop in penetrating the frozen ice cream, but the moisture on the scoop also makes it easier to remove the ice cream from the scoop once it has been cut from the body of ice cream within the respective ice cream container. However, in order to properly scoop the ice cream, it is necessary to open the ice cream canister (or other container) as far as possible so that sufficient energy can be expended in digging into the ice cream with the scoop. For cylindrical shaped containers (which are fairly standard in the ice cream industry), this means that the lid to the ice cream container must be removed completely. Indeed, for the commercial vendor of ice cream, all of the containers of the various flavors of ice cream are typically positioned in open containers (that is the lids are completely removed) so that the person dispensing the ice cream can reach down into each container from behind the freezer.

Needless to say, this manual scooping of ice cream can cause serious fatigue to a scooper employed by the commercial ice cream vendor. The scooper is continually bending over the freezers in order to retrieve the desired flavors of ice cream. This bending over affects back, leg, and arm muscles. Scooping is especially difficult if the ice cream is very hard. The net result is that the productivity of the ice cream scooper drops off rapidly.

Another problem associated with the manual scooping of hard ice cream for the commercial vendor is maintaining product control. That is, it requires skill and judgment on the part of the scooper in order to control the product amount. Hence, a "two-scoop ice cream cone" may contain significantly different amounts of ice cream depending upon the skill and judgment of the scooper. Thus, if the vendor is to maintain any semblance of product control, a significant training period is required for each employee.

Still another problem associated with the manual scooping of hard ice cream for the commercial vendor is the unsanitary conditions which prevail due to all the open containers of ice cream. As the scooper bends over the freezer in order to scoop the ice cream out of its respective containers, numerous articles can fall into the ice cream containers (such as hair, clothing, etc.). Moreover, it is not infrequent for the hands of the scooper to come into direct contact with the ice cream in order to force it into the ice cream scoop or to force it out of the ice cream scoop. Furthermore, as mentioned above, the scoops themselves are typically transferred from flavor to flavor after being merely dipped in water.

A futher problem facing the commercial ice cream vendor (who serves hard ice cream in spherical-shaped scoops) is that of energy conservation. That is, either the freezers themselves are open or the doors thereto are frequently left wide open. This means that the temperature within the freezers is hard to control, and that much of the tool temperature generated within the freezer is easily lost through the open areas. Moreover, the consistency of the ice cream from top to bottom becomes poor when the temperature cannot be maintained at a proper level. Also, as mentioned above, the relative difficulty in scooping the ice cream is, to a large extent, controlled by the temperature of the ice cream. Further, oxidation of ice cream along the edges of the container causes much ice cream to be wasted.

An additional problem facing the commercial ice cream vendor is that of making efficient use of his available space. Because the ice cream freezers from which the ice cream is scooped is generally of the horizontal type (as opposed to vertical up-right type), a great deal of floor space is required to house the freezers if a large variety of ice cream types and flavors are to be accessible. As more freezer space is used to house the increasing number of types and varieties of ice cream that are served, all of the above described problems become more pronounced.

The commercial ice cream vender also must grapple with the problem of storing sufficient ice cream at his dispensing location so that the wishes of the customers can be readily met. This typically will require a completely different freezer system in which the backup ice cream containers can be stored.

Also, the commercial ice cream vendor faces a significant hurdle in informing his clientele as to the various flavors that are available. A large sign or similar type poster displaying the names of the various flavors of ice cream is often ineffective because the customer invariably wants to see the ice cream before it is purchased. Accordingly, it is often necessary that the freezer units within which the ice cream is housed either have an open top or a glass front so as to enable the customer to look at the ice cream which he desires to purchase. Using a glass-walled freezer is not an efficient manner of maintaining the desired temperatures within the freezer unit; and, of course, allowing the customers to look into an open freezer is not only inefficient, but may be very unsanitary.

Because of all the above problems, there has been a long felt need for a suitable hard ice cream dispenser that could quickly, efficiently, and sanitarily, dispense a controlled unit of ice cream to a customer. To this inventor's knowlegdge the only prior art ice cream dispensers that have been developed to meet this need have been "soft" ice cream dispensers. Soft ice cream dispensers fall in the broad category of liquid food dispensers and accordingly do not fall within the field of this invention. Moreover, soft ice cream is just not the same as hard ice cream. To many, hard ice cream is the much more preferred dessert. Hard ice cream is generally of a superior quality and is available in a much broader variety of flavors. In fact, from what information this inventor has been able to learn, the primary reason that soft ice cream has even survived is because of the relative ease with which it can be dispensed. That is, even though a majority of the people prefer hard ice cream, the same majority of people do not like to wait very long to be waited on in a commercial establishment. Accordingly, they have tolerated soft ice cream because they can get it quickly and in a sanitary fashion. However, even soft ice cream dispensers do not have proportion controls to control the amount of ice cream dispensed per serving.

SUMMARY OF THE INVENTION

A first object of the present invention is to provide a hard food dispenser that accurately controls the amount of food dispensed per serving.

A second object of the present invention is to provide a food dispenser that dispenses spherical-shaped balls of hard food in a quick efficient manner.

A third object of the present invention is to provide such a dispenser that is especially suited for frozen foods, such as ice cream, sherbert, and the like.

A fourth object of the present invention is to provide a commercial hard ice cream dispenser that allows the ice cream (or similar food) to be dispensed without removing it from its commercial containers.

A fifth object of the present invention is to provide a hard ice cream dispenser that is easy to reload.

A sixth object of the present invention is to provide a complete hard ice cream dispensing system that can be used not only for dispensing a wide variety of ice cream flavors and types, but also for storing backup containers of ice cream.

A seventh object of the present invention is to provide a food dispensing system that efficiently uses available space and, at the same time, provides for the dispensing of a large variety of food types and flavors, each flavor and type being easily accessible to a waitress, waitor, or other similar person.

An eighth object of the present invention is to provide a dispensing system that includes an effective way of displaying the various types and flavors of food that can be dispensed.

A ninth object of the present invention is to provide a dispensing apparatus for dispensing ice cream and the like that is clean and sanitary for use in front of the public.

A tenth object of the present invention is to provide a dispensing system that reduces the skill, fatigue, and frustration required by prior art manual methods of dispensing hard ice cream and the like.

An eleventh object of the present invention is to provide a dispensing apparatus that maintains the ice cream or other food to be dispensed at below freezing temperatures in an energy-efficient manner.

A twelfth object of the present invention is to provide a commercial food dispenser that requires a minimum number of operators while at the same time providing a high volume of foods and food types that can be dispensed.

The above and other objects of the present invention are realized in an illustrative embodiment that includes a compartment into which the food to be dispensed may be placed. One end of the compartment is a moveable wall or plunger. This moveable wall is coupled to an external force so that it compresses the food within the compartment and maintains it at a constant pressure. On the other side of the compartment opposite the moveable wall or plunger is a nozzle or cone that directs the pressurized food to a discharge tube. At the end of the discharge tube is a scoop-forming device. When closed, this scoop-forming device allows the pressurized food to be forced up against the inside thereof. As the scoop-forming device is moved to its open, or dispensing position, it carves out and ejects a scoop of the pressurized food from the tip of the discharge tube. This ejected scoop of food may then be conveniently caught in any suitable container, such as a bowl, dish, or cone, from which it can be consumed.

In one embodiment of the invention, the compartment, including the nozzle or cone and the discharge tube, are housed in a freezer compartment. The food placed in the compartment for dispensing may thereby be maintained at a desired temperature. The moveable wall or plunger is controlled by a constant force that is conveniently applied external to the freezer compartment. Moreover, the scoop-forming device at the end of the discharge tube, while also being maintained within the lower temperature of the freezer compartment, is easily accessible from the exterior of the freezer by means of a small conveniently open door that is readily accessible.

In still another embodiment of the invention, several dispensing units (each comprising the compartment, moveable wall or plunger, nozzle or cone, discharge tube, and scoop-forming device) are arranged and packaged in a convenient module format so that a large number and wide variety of food types may be readily dispensed. A common freezer compartment may be used to maintain each of the respective dispensing units at a desired temperature. Moreover, the respective scoop forming devices may be positioned at convenient heights for easy access from the outside of the freezer compartment. Space within the common freezer compartment that does not lend itself to easy external access (such as close to the floor) may be conveniently used for storing the food containers (not yet loaded into the respective dispensing compartments) at a desired temperature.

BRIEF DESCRIPTION OF THE DRAWINGS

The above and other objects, features, and advantages of the invention will be more apparent from the following more particular description presented in connection with the accompanying drawings, in which.

DESCRIPTION OF THE PREFERRED EMBODIMENTS

The invention herein disclosed is best understood by reference to the figures wherein like parts are designated with like numerals throughout.

The preferred embodiment of the invention comprises a hard ice cream dispenser as set forth below. However, it is to be understood that the type of dispenser disclosed herein could be used for a wide variety of solid foods, such as sherbert, butter, salads, mashed potatoes, and the like.

Figure 1:
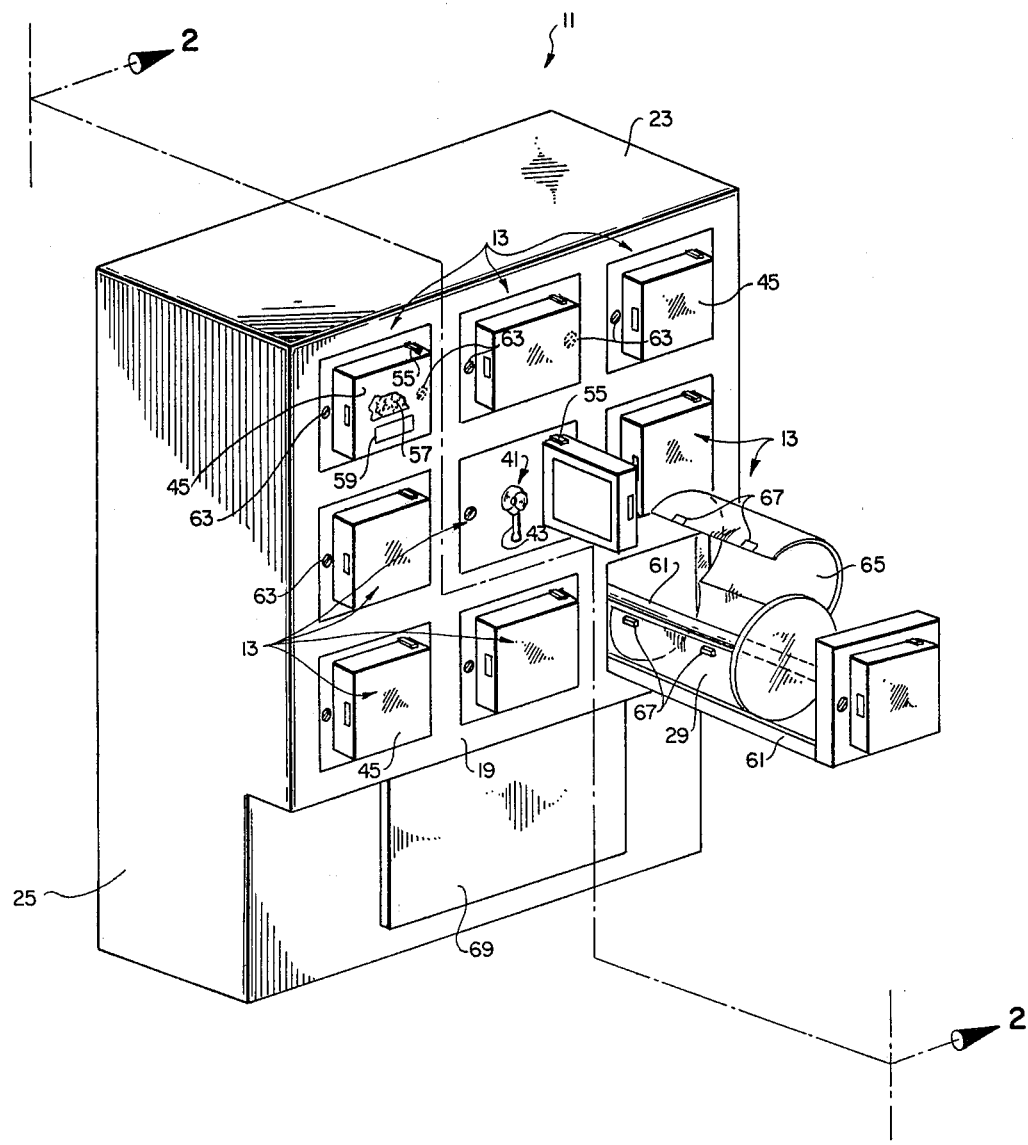
FIG. 1 is a perspective view of a nine unit dispenser built according to the present invention.
Figure 2:
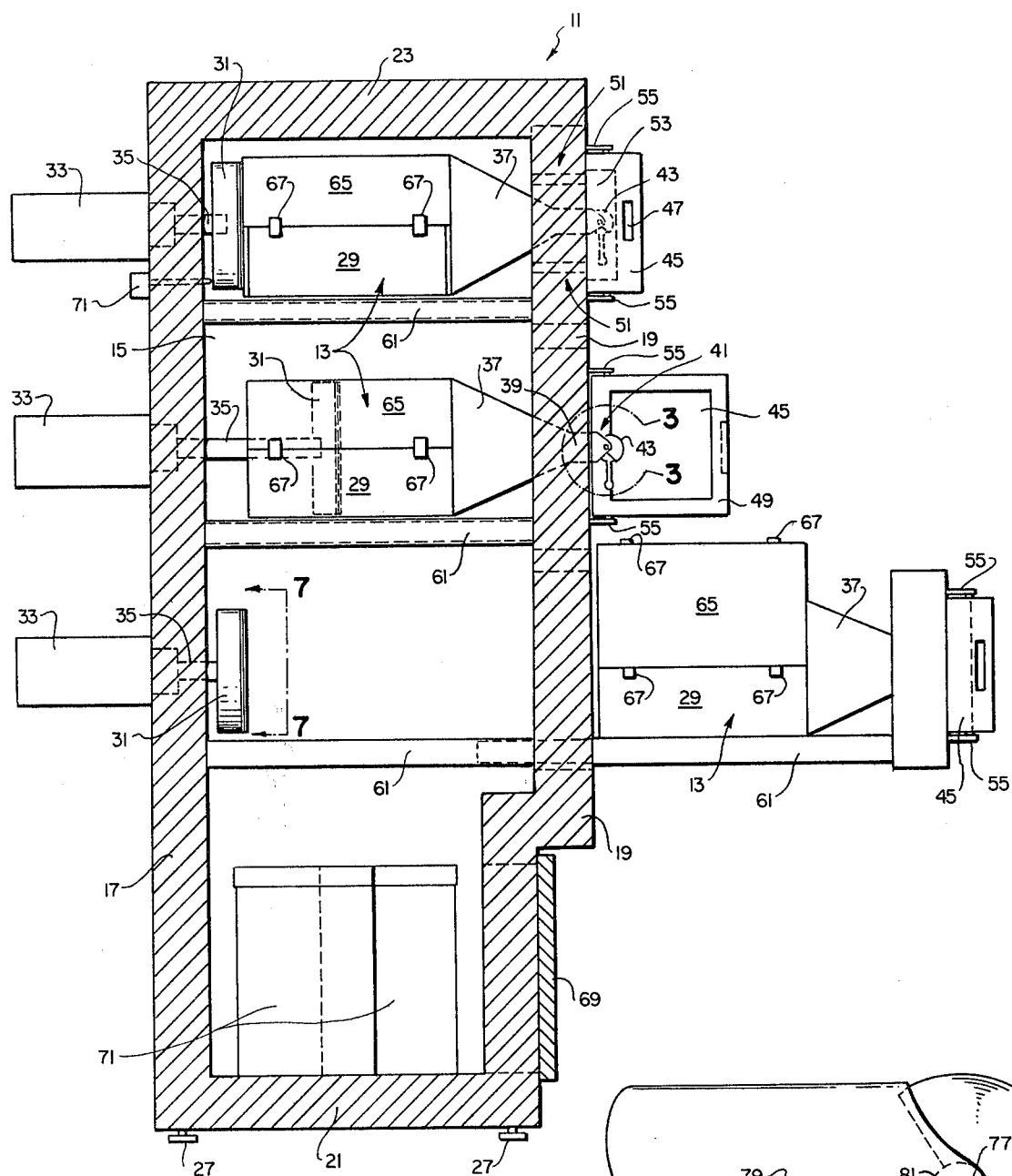
FIG. 2 is a sectional view taken along the line 2—2 of FIG. 1.

Referring first to FIGS. 1 and 2, there is shown a food dispensing apparatus 11 adapted to dispense nine different types or flavors of solid food, such as ice cream or sherbert. The construction of the dispensing apparatus 11 is generally modular in nature, thereby allowing any desired number of individual dispensing units 13 to be incorporated within the total dispensing system. The dispensing apparatus 11 includes a freezer or refrigeration compartment 15. This compartment 15 is of the up-right or vertical variety, having a back wall 17, a front wall 19, a bottom 21 and a top 23. Side walls 25 are also included. Typically, adjusting feet 27 will be uniformly spaced along the edges of the bottom 21 so as to allow the entire unit 11 to be adjusted to a level position. The motor and compressor (or other mechanism used to cool the inside of the compartment 15) may be conveniently located underneath the unit, behind the unit, or inside the unit.

Each of the individual dispensing units 13 that are included within the dispensing apparatus 11 include a horizontally disposed compartment or holding chamber 29 into which the ice cream (or other food to be dispensed) may be inserted. The back side of the holding chamber 29 is open and a plunger head 31 is adapted to tightly fit thereinto. The plunger head 31 is mechanically coupled to pressure means 33 by means of a plunger rod 35. The pressure means 33 exerts a longitudinal force through the rod 35 to the plunger head 31. Because the holding chamber 29 wherein the ice cream or other food is housed contains an open end thereinto, the plunger head 31 will be pushed into the chamber 29 and compress the ice cream (or other food) under the pressure produced by the pressure means 33. Thus, the plunger head 31 acts as a vertically disposed moveable wall of the holding chamber 29. In the side sectional view of FIG. 2, the plunger heads 31 associated with upper and lower dispensing units 13 are shown in their fully retracted position. The plunger head 31 associated with the middle dispensing unit 13, on the other hand, is shown extended into its respective holding chamber 29.

At the end of the holding chamber 29 opposite the plunger head 31 there exists a nozzle 37. This nozzle 37 is typically cone or funnel shaped, tapering down from the size of the holding chamber 29 to the size of a discharge tube 39 to which it is connected. The end of the holding chamber 29 to which the nozzle 37 is attached is also open, thereby allowing the ice cream or other food within the chamber 29 to be pushed into the nozzle 37 and discharge tube 39 by the force exerted from the plunger head 31.

One end of the discharge tube 39 protrudes through the front wall 19 of the freezer or refrigeration compartment 15. This protruding end, shown best at 41, is capped with a scoop-forming device 43. This scoop-forming device 43 is described in more detail in subsequent paragraphs.

When a particular dispensing unit 13 is not in use, a door 45 is closed around the scoop-forming device 43. This door 45 typically pivots on a vertically hinged axis and opens as shown generally in connection with the middle dispensing unit 13 (FIG. 1). A handle slot 47 (or other suitable handle) is included in the door 45 to enable it to be easily opened. In many respects, this door 45 resembles a conventional door on an up-right refrigerator or freezer (although much smaller). That is, a suitable seal or gasket 49 may be affixed around the inside periphery of the door 45. Also, the door may be weighted or otherwise biased so as to always return to its closed position except when it is opened to its full open position. The purpose of the door 45 is primarily to maintain the temperature around the scoop-forming device 43 and the protruding end of the discharge tube 39 at a level consistant with the temperature of the ice cream or other food that is forced thereinto. For most applications, a door 45 having a gasket 49 that is suitably insulated will maintain the temperature at the desired level. For some applications, however, it may be desirable to include openings in the front wall 19, such as shown in dotted lines at 51, to allow the cool air inside of the compartment 15 to circulate into the small chamber 53 formed by the closed door 45 around the scoop-forming device 43. Typically, the door 45 will be pivotally mounted to the dispensing apparatus 11 with hinge plates 55 positioned, for example, at the right side of the doors 45.

As shown in FIG. 1, when the doors 45 are in the closed position, the front face thereof may conveniently be used to display a picture 57 of the ice cream (or other food) that is contained within that respective dispensing unit. A title plate 59 may also be used to indicate the name of the ice cream (or other food), its price, and any other desired information.

Each dispensing unit 13 is mounted within the dispensing apparatus 11 in a respective drawer that may be pulled out of the apparatus 11 when the holding chamber 29 of the respective dispensing 13 needs to be reloaded or cleaned. Drawer guides 61 are mounted within the dispensing apparatus 11. Typically, these drawer guides comprise telescoping members, at least one of which is permanently mounted to the inside of the dispensing apparatus 11 and at least one other of which is securely fastened to the holding chamber 29 of each respective dispensing unit 13. Bearings, such as wheels, inserted inside of these members allow them to be easily pushed together or extended apart. A portion of the front wall 19 of the freezer or refrigerator compartment 15 serves as a front to these drawers. Drawer latches 63 serve to securely hold these drawers in their closed position except when it is desired to reload the dispensing units 13 with the ice cream or other food to be dispensed. As shown in FIGS. 1 and 2, these dispensing unit drawers are very similar to a filing cabinet drawer. Any suitable drawer mechanism could be used to achieve this function, including the use of more than one drawer guide per side of the dispensing unit.

Each holding chamber 29 has a respective lid 65 that is latched in its closed position by chamber latches 67. When the latches 67 are released, the lid 65 may be pivoted to its open position, as shown in connection with the lower right-hand dispensing unit in FIGS. 1 and 2. With the lid 65 opened, the desired flavor of ice cream or other food may be readily inserted into the holding chamber 29.

To facilitate the loading of the ice cream or other food into the respective holding chambers, the holding chambers 29 will typically have a form and shape consistant with the containers within which the ice cream or other food are commercially purchased. For example, ice cream or sherbert is typically commercially available in two gallon drums made of cardboard or a similar material. These drums are cylindrical in shape having a lid that tightly fits around the top thereof. Thus, when the dispensing apparatus 11 is used for dispensing ice cream that is purchased in such drums, the holding chambers 29 will accordingly be drum-shaped. The drum of ice cream is inserted within the chamber 29 after removing its lid and cutting away its bottom. In this fashion, the commercial container of ice cream (or similar food) serves as a cartridge that is readily inserted into each dispensing unit. Thus, loading of each individual unit may be quickly and neatly done with a minimum of effort and time, and without having an operator come in direct contact with the ice cream (which direct contact could result in contamination).

A bottom portion of the freezer or refrigerator compartment 15 may be used for storing extra containers, such as drums of ice cream not yet loaded into the holding chambers. Access to this storage compartment could be easily achieved through a storage door 69. In FIG. 2, some containers 71, such as drums of ice cream (or other food) are shown located in this lower storage area of the freezer or refrigerator compartment 15.

In the preferred embodiment of the invention, the pressure means 33 are respectively realized using an air cylinder, such as the Parker "P" series air cylinder. Suitable gauges and controls (not shown) are used to maintain the pressure within the air cylinders at a desired level. A suitable microswitch 71, or other type of sensing device, may also be employed with the invention to sense the physical location of the plunger head 31. The sensor 71 could thereby be adapted to indicate when the plunger head 31 is retracted to its empty position (indicating the holding chamber 29 may be reloaded). Such a sensor could also be used to indicate when the plunger head 31 has moved all the way through the chamber 29 (indicating that it is time to retract the plunger head 31 and reload the unit with a new supply of ice cream or other food). While the sensor 71 is shown in FIG. 2 as being mounted external to the freezing or refrigeration compartment 15, numerous types of sensors could be selectively positioned at needed locations both inside of and outside of the compartment 15. Also, while an air cylinder is shown to realize the pressure means 33 in the preferred embodiment, there are also numerous other devices which could be used to realize the desired pressure. For instance, a hydraulic cylinder could be employed, as could a mechanical configuration using springs, motors, and the like (see, e.g., FIG. 10).

The pressure required to properly extrude the ice cream or other food through the dispensing mechanism depends upon the temperature at which the food is to be maintained and, to a large extent, the contents of the food. For example, the inventor has determined that ice cream, prefrozen at 0° F., requires between 3 to 3½ PSI (pounds per square inch) depending upon the butter fat content of the ice cream. Correspondingly, ice cream to be maintained at −10° F. would require between 3¾ to 4¼ PSI in order to have it properly extruded through the dispensing mechanism. The pressure means 33, of course, provides the desired level of pressure that is required. As mentioned above, appropriate controls and sensors are typically used in conjunction with the pressure means 33 so as to always maintain the pressure at a desired constant level.

Figure 3:
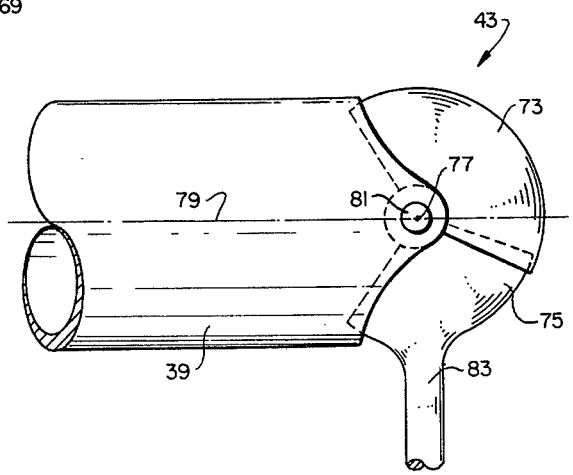
FIG. 3 is an exploded side view of the dispensing mechanism or scoop-forming device encircled by the line 3—3 of FIG. 2.
Figure 4:
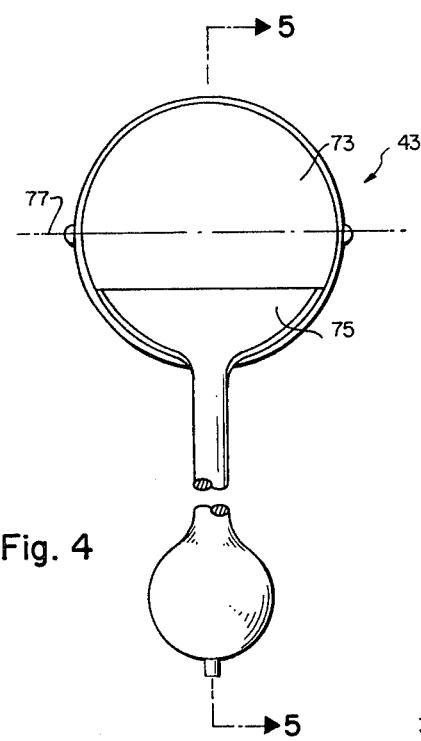
FIG. 4 is an end view of the dispensing mechanism or scoop-forming device encircled by the line 3—3 in FIG. 2.
Figure 5:
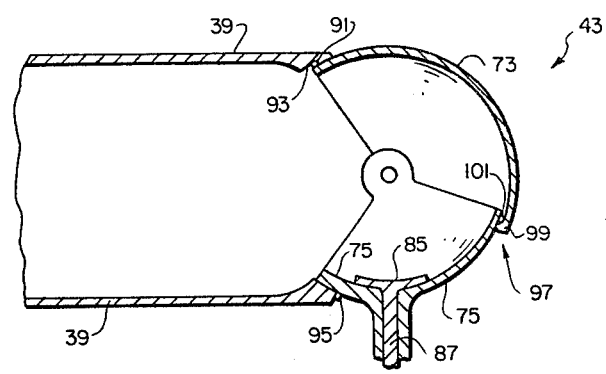
FIG. 5 is a sectional view taken along the line 5—5 of FIG. 4.
Figure 6:
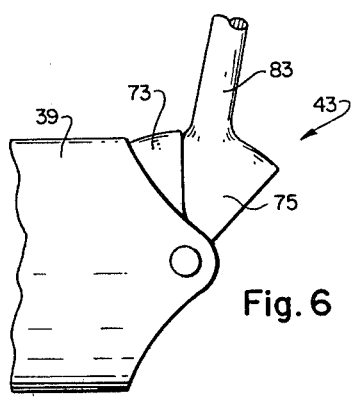
FIG. 6 is a side view of the dispensing mechanism or scoop-forming device of FIG. 3, moved to its dumping or ejecting position.

Referring next to FIGS. 3 through 6, there is shown an exploded view or views of the protruding end of the discharge tube 39 and the screw forming device 43. In particular, FIG. 3 is a side view of the scoop-forming device 43 and discharge tube 39 with the scoop-forming device 43 in its closed position. FIG. 4 is a front view of the scoop-forming device 43, and FIG. 5 is a sectional view taken along the line 5—5 of FIG. 4. FIG. 6 illustrates the scoop-forming device 43 when moved to its dump position.

The scoop-forming device 43 includes an outer scoop 73 and an inner scoop 78. Both of these scoops are pivotally mounted to the end of the discharge tube 39. In the preferred embodiment of the invention, the pivotal axis 77 about which the scoops 73 and 75 are mounted, is a horizontal axis that is orthogonal to the longitudinal axis 79 of the discharge tube 39. Any suitable method may be used for pivotally mounting the scoops 73 and 75 to the discharge tube 39. In the preferred embodiment, however, respective protruding ears from both the inner scoop 75 and the outer scoop 73 fit within a pivot mounting hole or dimple 81 located at the tip of the discharge tube 39. These protruding ears of the inner and outer scoops are concentric so that the ears of the outer scoop 73 fit snuggly within the hole 81, while the ears of the inner scoop 75 fit within hollow indentations located within the ears of the outer scoop 73.

The scoops 73 and 75 are typically segments of a sphere. The outer scoop 73 comes very close to being a true hemisphere (half of a sphere) while the inner scoop 75 is closer to one third of a sphere. The outside diameter of the outside scoop 73 is approximately equal to the inside diameter of the discharge tube 39. Similarly, the outside diameter of the inner scoop 75 is approximately equal to the inside diameter of the outside scoop 73.

A scoop handle 83 is connected to the inner scoop 75. A knob 85 is placed at the end of this scoop handle 83 in the preferred embodiment. When the scoops 73 and 75 are pivoted to their closed position, as shown in FIGS. 3, 4, and 5, the handle 83 typically points in a downward direction as shown. Gravity forces tend to maintain this closed position. When it is desired to pivot the scoops to the dump position, as shown in FIG. 6, all that need be done is to rotate the handle 83 approximately 170°. This rotation may be easily accomplished by manual forces, although any external force could be applied.

A push plate 85 is provided on the inside of the inner scoop 75 for pushing or ejecting the scoop away from the scoops when they have been rotated to the dump position. A finger rod 87 is connected to the push plate and extends concentrically through the length of the handle 83. The tip of the finger rod 87 protrudes through the end of the knob 84 located at the end of the handle 83. A spring 89, also located in the knob 84 of the handle 83, exerts a radial force on the push plate 83 through the finger rod 87 so as to always maintain the plate 85 against the inner surface of the inner scoop 75.

Referring specifically to FIG. 5, a nub 91 (or equivalent protruding member) is adapted to engage with a corresponding slit or groove 93 within the inside wall of the discharge tube 39 so as to prevent or stop the outer scoop 73 from pivoting in a clockwise direction (as viewed in FIG. 5) past its desired closed position. Similarly, another nub 95 is attached to the outer surface of the inner scoop 75 so as to bump up against the end of the discharge tube 39 whenever the closed position has been reached. Thus, the nub 95 prevents the inner scoop 75 from rotating in a clockwise direction (as viewed in FIG. 5) past its closed position. For reasons which will be more apparent below, the edge of the outer scoop 73 where the nub 91 is located is referred to as the leading edge of the outer scoop, while the edge closest to the nub 95 of the inner scoop is referred to as the trailing edge of the inner scoop. At the location where the trailing edge of the outer scoop and the leading edge of the inner scoop join in FIG. 5, shown generally at 97, means are provided to couple clockwise rotation of the inner scoop 75 to the outer scoop 73. Typically, these coupling means include a lip or ridge 99 at the trailing edge of the outer scoop 73. A mating lip or ridge 101 is provided on the leading edge of the inner scoop 75. As the outer scoop 73 and the inner scoop 75 are rotated from their dump position as shown in FIG. 6 to their closed position as shown in FIG. 3 (or FIG. 5), the ridge 101 of the inner scoop 75 catches hold of the ridge 99 of the outer scoop 73 and pulls it back to its closed position.

With the scoops in their closed position, as shown best in FIG. 5, the force F produced by the pressure means 33 forces the ice cream or other food through the discharge tube 39 and into the inside of the inner and outer scoops 73 and 75. When it is desired to eject a scoop of ice cream or other food from the dispensing apparatus 11, a force is placed on the handle 83 so as to rotate it in a counterclockwise direction (as viewed in the FIGS.). After the handle 83 has rotated approximately 70° to 80°, the edge of the handle will engage the trailing edge of the outer scoop 73. As the handle 83 is further rotated in a counterclockwise direction, the outer scoop 73 is also forced to rotate in a counterclockwise direction. This counterclockwise motion causes the leading or cutting edge of the outer scoop 73 to cut through the ice cream or other food located within the discharge tube 39. As it cuts through the ice cream or food, a spherical-shaped scoop is carved out from the ice cream (or other food) located within the end of the discharge tube. As the handle 83 reaches the dump position as shown in FIG. 6, the scoop of ice cream or other food may be easily removed from the scoops and caused to fall within a dish, cone, or other utensil from which the ice cream or food is to be eaten. If needed, the operator may push on the finger rod 87, thereby causing the push plate 85 to move radially inward and cause the scoop to be ejected from the scoop-forming device 43.

Once the scoop of ice cream or other food has been removed from the scoop-forming device 43, the handle 83 may be pivoted back to its closed position. As it pivots, both the inner and outer scoops 75 and 73 will also pivot back to their respective closed positions as above described. It should be noted that because the inner scoop may rotate approximately 70° to 80° with respect to the outer scoop 73 before any rotational motion is coupled from the inner scoop to the outer scoop, the discharge tube 39 will be more than half closed with the inner scoop 75 before the outer scoop 73 begins to move from its dump position. Thus, before the outer scoop 73 has moved or pivoted a sufficient amount to allow ice cream or other food to again enter the scoop forming region (inside of the scoop 73 and 75), the scoops have effectively returned to their closed position, thereby preventing any ice cream or other food from being pushed out of the tube 39 prior to the time the scoops are returned fully to their closed position. Advantageously, a small air vent is provided generally at the location 97 so as to allow air trapped inside of the scoop-forming region to escape as additional ice cream (or other food) is forced thereinto.

Figure 8:
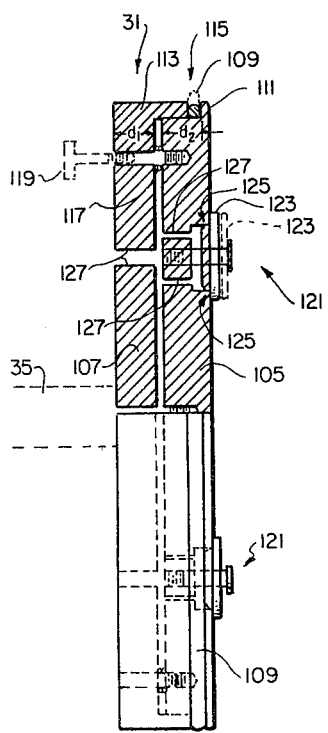
FIG. 8 is a sectional view taken along the line 8—8 of FIG. 7.
Figure 7:
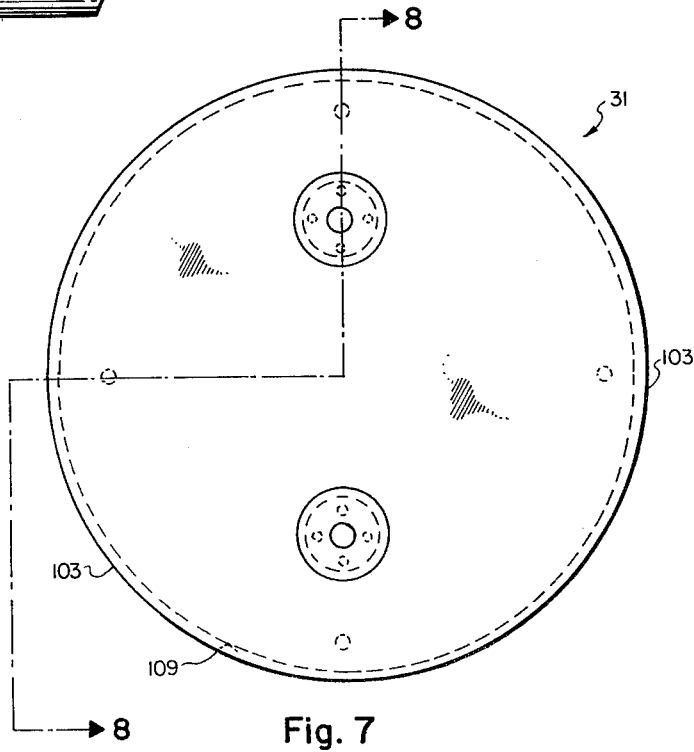
FIG. 7 is a front view of the moveable wall or plunger as viewed from the line 7—7 of FIG. 2.

Referring next to FIG. 7, a front view of the plunger head 31 is shown. FIG. 8 is a sectional view taken along the line 8—8 of FIG. 7. The purpose of the plunger head 31 is to compress the ice cream or other food and maintain it at a constant pressure. Accordingly, when pressure is exerted on the ice cream or other food, it is required that a tight seal exist around the periphery 103 of the plunger head 31. This tight seal needs to be maintained regardless of any irregularities or deformities which might exist in the container housing the ice cream or in the side walls of the holding chamber 29. On the other hand, when the plunger head 31 is retracted or withdrawn away from the ice cream or other food, it is desirable that there not be a tight seal around the periphery 103. Not having a tight seal therearound during the retraction allows the plunger head 31 to be more easily returned to its loading position; and also allows air to escape from behind the plunger head 31.

The plunger head 31 is realized in the preferred embodiment by using a front plate 105 and a rear plate 107. An "O" ring 109 extends around the complete plunger head 31 and serves as a spacer between the front and rear plates. In particular, as shown in FIG. 8, the front plate 105 has a front lip 111 extending around the front edge thereof. Similarly, the rear plate 107 has a protruding collar 113 extending around the front side thereof. The "O" ring 109 advantageously fits between the collar 113 and the flange 111. As a pressure or force is exerted on the rear plate 107, this force causes the "O" ring 109 to become elongated, as shown by the dotted lines at 115. This elongation effectively increases the diameter of the plunger head 31 and provides a suitable flexible gasket that tightly seals the edges around the plunger when it is moved in the forward direction. It should be noted that the width of the rear plate 107 (not including the width of the collar 113) is carefully chosen with respect to the width of the front plate 105 (not including the width of the flange 111) so that the O ring 109 can never be compressed beyond the point where it might become permanently deformed. Moreover, at least one spring 117 is selectively positioned between the front plate 105 and the rear plate 107 so as to exert a mild separation force between these two plates. The purpose of this spring 117 is to allow the rear plate 107 to be pushed back away from the front plate 105 whenever the force from the pressure means 33 is removed from the back side of the plunger head 31 (that is when the force is removed from the rear plate 107). With the rear plate 107 pushed back away from the front plate 105 in this fashion, the "O" ring 109 can return to its normal shape, and thereby allow the plunger head unit 31 to be more easily moved in the reverse direction. Typically, bolts 119 (passing through the rear plate 107 and threadably inserted into the front plate 105) will be used to secure the rear plate 107 to the front plate 105, although any suitable coupling means could be used that enables the rear plate 107 to move relative to the front plate 105.

At least one check valve 121 is also provided as part of the plunger head unit 31 in the preferred embodiment. The function of the check valve 121 is to allow air to flow through the front plate 105 and the rear plate 107 as the plunger head unit 31 is retracted (or moved away from the ice cream or other food). Any suitable method of construction that allows air to pass from the rear side of the plunger head unit 31 to the front side thereof could be used for this check valve. As shown in FIG. 8, the preferred embodiment employs a movable plate 123 that is forced up against the front surface of the front plate 105 whenever the plunger head unit 31 has pressure applied to the rear side thereof. With the movable plate 123 forced up against the front surface of the front plate 105, the air vent holes 125 are blocked and air cannot pass therethrough. A suitable network of air channels 127 exists behind the air vent holes 125 to allow air to pass from the rear side of the rear plate 107 to the air vent holes 125. When a retracting force is placed on the plunger head 31, the movable plate 123 may be pushed forward (as shown by the dotted lines in FIG. 8), thereby allowing air to pass from the rear side of the plunger head 31 to the front side.

Figure 10:
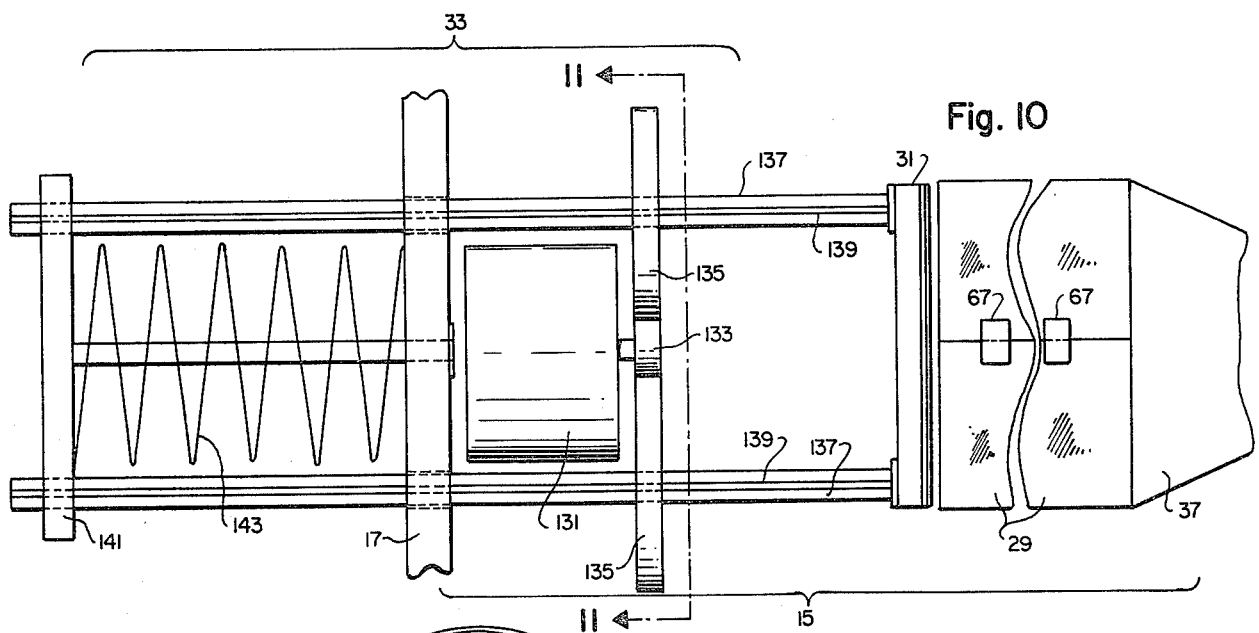
FIG. 10 is a schematic representation of an alternative embodiment of a dispensing unit, illustrating the use of a motor/spring combination for moving the plunger or moveable wall.
Figure 11:
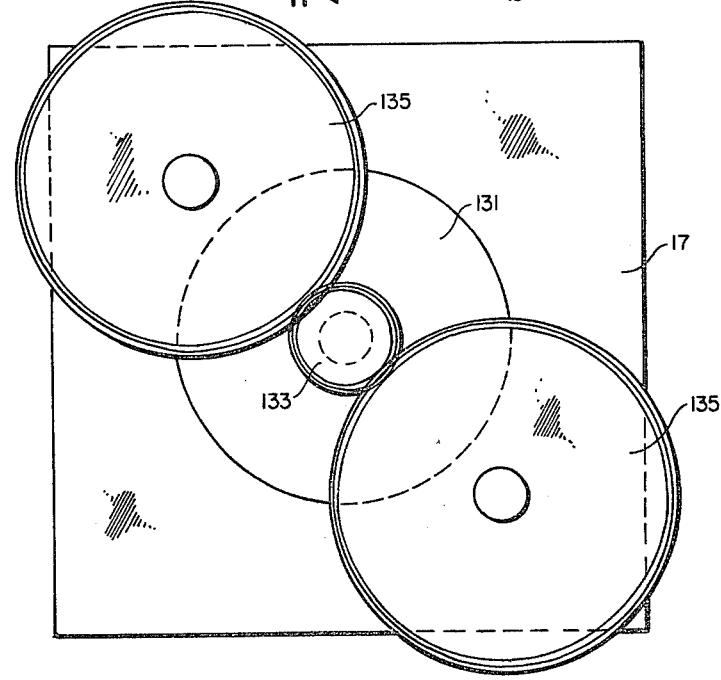
FIG. 11 is a view of the dispensing unit shown in FIG. 10, taken along line 11—11.

In FIGS. 10 and 11, there is shown an alternative embodiment for realizing the pressure means 33. This realization includes a bi-directional electric motor 131 that is permanently mounted just inside the back wall 17 of the refrigeration or freezer compartment 15. The motor 131 drives a tooth gear 133 which, in turn, drives a pair of toothed gears 135. Threaded rods 137 respectively pass through the center of the gears 135. The center of the gears 135 is correspondingly threaded so that as the gears 135 rotate, the rods 137 are forced to move in and out depending upon the direction of rotation. A keyway 139 is provided in each of the threaded rods 137 so as to prevent the rods from rotating. The rods 137 attach to the back side of the plunger head unit 31. Thus, as the rods 137 are forced to move in or out, the plunger head unit 31 also moves in or out of the holding chamber 29.

Still referring to FIG. 10, the threaded rods 137 pass through the rear wall 17 and connect to a back plate 141. A large coil spring is suitably inserted between the back plate 141 and the rear wall 17. The spring forces from the spring 143 are transferred through the rods 137 to the plunger head unit 31 so as to impart a resilient property to the plunger head unit 31. Suitable positioning and pressure sensors (not shown) may be employed with the alternative embodiment shown in FIG. 10 so as to signal when a desired pressure has been achieved and/or when it is time to reload the dispensing unit.

A modification to the alternative embodiment shown in FIG. 10 would include placing the motor 131, as well as the gears 133 and 135 on the outside of the freezer or refrigeration compartment 15. If this modification is done, the spring 143 could remain on the outside of the freezing compartment 115, or it could be placed on the inside thereof.

Still an alternative embodiment of a dispensing unit 13 would replace the pressure means 33 with extraction means for pulling the ice cream or other food from a holding chamber to a suitable scoop-forming device (such as the scoop-forming device 43 of FIGS. 1 and 2). This extraction means could be realized, for example, by a large teflon screw that has an outside diameter approximately equal to the inside diameter of the container where the ice cream or other food is held. The screw is forced into the container of food and caused to rotate by a motor or other means. As it rotates, the ice cream or food is pulled from the container and carried to the scoop-forming device. Thus, the large teflon screw acts as a conveying mechanism, similar to an archimedes' screw, for moving the ice cream or other food from its container to the scoop-forming device under a relatively constant pressure.

Figure 9:
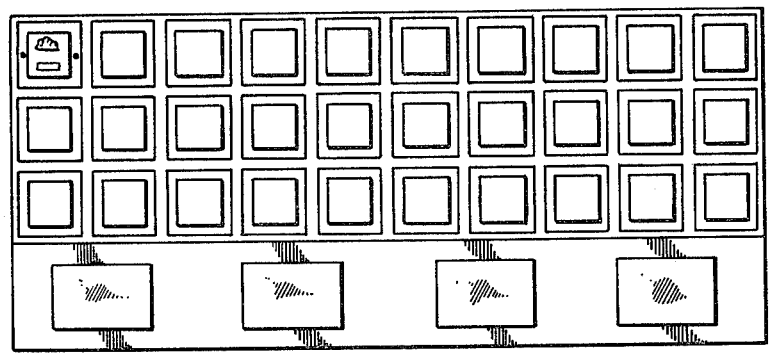
FIG. 9 is a front view of a 30-unit dispenser built according to the present invention.

FIG. 9 shows a front view of a food dispensing apparatus built according to the principles taught above expanded to include thirty individual dispensing units. Any number of desired dispensing units could, of course, be included within the dispensing apparatus. One of the specific advantages of the type of construction shown in FIGS. 1 and 2 is that it lends itself to a modular concept wherein units of 3, 6, 9, or 12, dispensing units could easily be added to an existing system.

As described in the preceeding paragraphs, a food dispensing apparatus is realized that is ideally suited for dispensing hard ice cream, sherbert, or similar desert-type foods, in an efficient and sanitary manner. Not only is the amount of ice cream or other food per serving controlled in a uniform fashion, but the dispenser allows spherical-shaped balls (which are a traditional favorite)

to be quickly served. Moreover, the system is compatible with present commercial ice cream containers—these containers being able to be reloaded into the mechanism with a minimum amount of trouble. Furthermore, a total system is provided so that another freezer is not required for storage of additional amounts of ice cream. Also, the horizontal dispenser system herein described saves space in that many of the different and types of ice cream can be vertically stacked up a wall rather than horizontally spread out over a given floor area (as in common in the present practice). This not only saves space, but it more efficiently utilizes the time of the waitress serving the ice cream in that the desired type or flavor is quickly located and dispensed. Also, the system is especially effective for displaying the type or flavor of ice cream which is available in each individual dispensing unit. A customer desiring to purchase a scoop or scoops of ice cream (or other food) merely has to scan the wall where the dispensing system is placed and from the pictures and/or word descriptions given on the individual doors make his or her selection. Once the selection is made the waitress or waiter need only go to the selected unit, open the door, place a dish or cone below the dispensing device, grab the handle, lift it up, eject the scoop of ice cream thus formed into the dish or cone, and present it to the customer. This method not only reduces the skill, fatigue, and frustration that is often attendant using prior art methods for dispensing hard ice cream, but it is an efficient and sanitary way of handling the ice cream in a commercial environment.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims the invention may be practiced otherwise than as specifically described herein.

What is claimed is:

1. An apparatus for dispensing a semisolid substance in scoops having a generally spherical shape and a uniform consistency, said apparatus comprising:
   a closed container into which said semisolid substance may be loaded;
   pressure means for forcing said semisolid substance against a front wall of said closed container;
   exit means for allowing said semisolid substance to exit through said front wall in response to said pressure means;
   scoop dispensing means coupled to said exit means for forming said semisolid substance into a scoop having a generally spherical shape and a uniform consistency, and for delivering said spherical scoop to a user of said apparatus;
   said semisolid substance comprising a food;
   said pressure means comprising a helical spring adapted to apply a force against said movable end wall of said closed container; and
   said pressure means further including motor means for compressing said spring to a desired force level.

2. A scoop dispensing apparatus as defined in claim 1 wherein said motor means includes a bi-directional motor that drives a variable-length plunger, said plunger being coupled to said spring and said movable end wall.

3. A system for dispensing a wide variety of flavors and types of hard ice cream and the like in spherical-shaped scoops comprising:
   a freezer unit;
   a plurality of horizontally disposed, vertically stacked compartments within said freezer unit;
   a scoop dispensing unit attached to a forward end of each of said compartments, each of said scoop dispensing units including:
   a closed container having a rearward pressure side and a forward front wall into which a desired flavor or type of said ice cream may be placed;
   horizontally disposed pressure means within the closed container for applying a constant force of at least 3 psi against said ice cream and front wall of said closed container;
   exit means coupled along the direction of horizontal force to the front wall for allowing said ice cream to exit through said front wall in response to said pressure means; and
   scoop forming means coupled to said exit means for forming said ice cream through said exit means into a generally spherical shape of uniform consistency that is selectively delivered to a user of said dispensing system.

4. A scoop dispensing system as defined in claim 3 further including storage means for storing containers of said ice cream prior to placing said ice cream in one of said closed containers.

5. A system for dispensing a wide variety of flavors and types of hard ice cream and the like in spherical-shaped scoops comprising:
   a freezer unit;
   a plurality of compartments within said freezer unit; and
   a scoop dispensing unit attached to each of said compartments, each of said scoop dispensing units including:
   a closed container into which a desired flavor or type of said ice cream may be placed;
   pressure means for forcing said ice cream against a front wall of said closed container;
   exit means for allowing said ice cream to exit through said front wall in response to said pressure means; and
   scoop forming means coupled to said exit means for forming said ice cream forced through said exit means into a generally spherical shape of a uniform consistency that is selectively delivered to a user of said dispensing system; said scoop forming means comprising:
   a discharge tube enclosing said exit means and protruding out therefrom;
   an outer scoop having a generally hemispherical shape with an outside diameter that is approximately equal to the inside diameter of said discharge tube, said outer scoop being pivotally mounted to the protruding end of said discharge tube and respective pivot points located on opposing sides of said tube and aligned with a center axis of said outer scoop, said outer scoop being adapted to pivot between a closed position, wherein the concave side of said outer scoop faces into and essentially closes the protruding end of said discharge tube, and a dispense position, wherein the concave side of said outer scoop faces out of and essentially closes the protruding end of said discharge tube;

an inner scoop having an approximate hemispherical shape with an outside diameter that is roughly equal to the inside diameter of said outer scoop, said inner scoop being pivotally mounted to said outer scoop and discharge tube at the same pivot points of said outer scoop, whereby said outer and inner scoops generally form a hemisphere when pivoted so that their respective concave sides face in the same direction, and they generally form a sphere when pivoted so that their respective concave sides face into each other; and means for pivoting said inner and outer scoops.

6. A scoop dispensing system as defined in claim 5 further including slidable drawer means respectively attached to each of said scoop dispensing units and said freezer unit, whereby each of said scoop dispensing units may selectively be slid into a respective compartment within said freezer unit when said dispensing unit is to be used to dispense ice cream, and selectively slid out of its respective compartment when the closed container of said scoop dispensing unit is to be reloaded with more ice cream.

7. A scoop dispensing system as defined in claim 5 wherein said scoop forming means further includes scoop ejection means for ejecting a scoop of ice cream from said inner and outer scoops.

8. A scoop dispensing system as defined in claim 7 further including door means for covering said scoop dispensing means when not in use, thereby maintaining the temperature around said scoop dispensing means at a desired level.

9. A scoop dispensing system as defined in claim 8 wherein said door means includes a front surface upon which signs, pictures, and the like, may be placed, said signs, pictures and the like describing the ice cream contained within its respective dispensing apparatus.

10. A scoop dispensing system as defined in claim 7 wherein said pivoting means comprises a handle that is radially attached to said inner scoop.

11. A scoop dispensing system as defined in claim 10 wherein said ejection means comprises:
a push rod concentric with said radial handle, a first end of said push rod protruding beyond the tip of said handle and a second end ending through said inner scoop;
a push plate perpendicularly attached to said second end; and
spring bias means for maintaining said push plate against the inner surface of said inner scoop save when an external force is longitudinally applied to the first end of said push rod.

12. An apparatus for dispensing a semisolid substance in scoops having a generally spherical shape and a uniform consistency, said apparatus comprising:
a closed container into which semisolid substance may be loaded;
pressure means for forcing said semisolid substance against a front wall of said closed container;
exit means for allowing said semisolid substance to exit through said front wall in response to said pressure means; and
scoop dispensing means coupled to said exit means for forming said semisolid substance into a scoop having a generally spherical shape and a uniform consistency, and for delivering said spherical scoop to a user of said apparatus;
said scoop dispensing means comprising:

a discharge tube enclosing said exit means and protruding out therefrom; and
an outer scoop having a generally hemispherical shape with an outside diameter which is approximately equal to the inside diameter of said discharge tube, said outer scoop being pivotally mounted to the protruding end of said discharge tube at respective pivot points located on opposing sides of said tube and aligned with a center axis of said outer scoop, said outer scoop being adapted to pivot between a closed position, wherein the concave side of said outer scoop faces into and essentially closes the protruding end of said discharge tube, and a dispense position, wherein the concave side of said outer scoop faces out of and essentially closes the protruding end of said discharge tube;
means for pivoting said outer scoop from said closed position to said dispensing position, said semisolid substance being forced up against the concave side of said outer scoop by said pressure means when in said closed position, and said semisolid substance being cut by a leading edge of said outer scoop as it pivots from said closed position to said dispensing position, whereby an essentially spherical-shaped scoop of said semisolid substance is carved out of the semisolid substance contained within said discharge tube;
scoop removal means for removing the scoop of semisolid substance from said outer scoop;
said scoop dispensing means further comprising:
an inner scoop having an approximate hemispherical shape with an outside diameter that is roughly equal to the inside diameter of said outer scoop, said inner scoop being pivotally mounted to said outer scoop and a discharge tube at the same pivot point of said outer scoop, whereby said outer and inner scoops generally form a hemisphere when pivoted so that their respective concave sides face in the same direction, and they generally form a sphere when pivoted so that their respective concave sides face into each other; and
means for pivoting said inner scoop, relative to said outer scoop.

13. A scoop dispensing apparatus as defined in claim 12 further including door means for covering said scoop dispensing means when not in use, thereby maintaining the temperature around said scoop dispensing means at a desired level.

14. A scoop dispensing apparatus as defined in claim 12 further including air vent means for allowing air to be vented through said inner and outer scoops.

15. A scoop dispensing apparatus as defined in claim 12 wherein said front wall of said closed container comprises a funnel shaped cone that tapers down to said exit means, said exit means comprising a discharge tube.

16. A scoop dispensing apparatus as defined in claim 12 wherein the pivoting axis of said outer and inner scoops lies in a horizontal line that is orthogonal to the longitudinal axis of said discharge tube.

17. A scoop dispensing apparatus as defined in claim 16 wherein said means for pivoting said inner scoop relative to said outer scoop comprises a protruding handle having one end attached to the back or convex side of said inner scoop, the other end of said handle generally pointing downward when said scoops are in their closed position and upward when said scoops have been pivoted to their dispensing position, said handle being adapted to allow manual forces to be applied thereto by pivoting said inner scoop about said pivot points.

18. A scoop dispensing apparatus as defined in claim 17 wherein said means for pivoting said outer scoop comprises said handle attached to said inner scoop, said handle being adapted to engage a non-leading edge of said outer scoop as said inner scoop is pivoted from the closed to dispensing positions.

19. A scoop dispensing apparatus as defined in claim 18 wherein said means for pivoting said outer scoop further includes a first stop selectively positioned along a non-leading edge of said outer scoop and a second stop selectively positioned along a leading edge of said inner scoop, said second stop being adapted to engage said first stop as said inner scoop is pivoted back to the closed position from the dispensing position, thereby causing said outer scoop to also be pivoted back to the closed position from the dispensing position.

20. A scoop dispensing apparatus as defined in claim 19 further including additional stops positioned inside of the protruding end of said discharge tube, said additional stops being adapted to prevent said outer scoop from pivoting beyond the limits of said dispensing and closed positions.

21. An apparatus for dispensing a semisolid substance in scoops having a generally spherical shape and a uniform consistency, said apparatus comprising:
  a horizontally disposed, closed container into which said semisolid substance may be loaded, said container having a rearward pressure side and a forward front wall;
  pressure means horizontally disposed and at least partially contained within the closed container in the rearward pressure side and adapted with means for establishing a constant force of at least 3 psi against said solid substance and the front wall of said closed container;
  exit means for allowing said semisolid substance to exit through said front wall in response to said pressure means; and
  scoop dispensing means coupled to said exit means for forming said semisolid substance into a scoop having a generally spherical shape and a uniform consistency, and for delivering said spherical scoop to a user of said apparatus.

22. A scoop dispensing apparatus as defined in claim 21 wherein said pressure means comprises a helical spring adapted to apply the constant force against said movable end wall of said closed container.

23. A scoop dispensing apparatus as defined in claim 22 wherein said pressure means comprises an air cylinder adapted to force a plunger rod therefrom with a force determined by the air pressure contained in said air cylinder, said plunger rod being horizontally connected to the movable end wall of said closed container, said movable end wall thereby comprising the plunger head of said air cylinder.

24. A scoop dispensing apparatus as defined in claim 23 wherein said pressure means further includes monitoring and control mechanisms coupled to said air cylinder for maintaining the pressure of said plunger head at a relatively constant level regardless of the linear position of said plunger rod.

25. A scoop dispensing apparatus as defined in claim 24 further including position sensing means for sensing when said plunger head has moved completely through said closed container, said sensing means thereby indicating when the closed container is empty and needs to be reloaded with said semisolid substance.

26. A scoop dispensing apparatus as defined in claim 25 further including a cooling compartment inside of which said closed container is housed, said scoop dispensing means being accessible from the exterior of said cooling compartment.

27. A scoop dispensing apparatus as defined in claim 26 wherein said scoop dispensing means comprises:
  a discharge tube enclosing said exit means and protruding out therefrom; and
  an outer scoop having a generally hemispherical shape with an outside diameter that is approximately equal to the inside diameter of said discharge tube, said outer scoop being pivotally mounted to the protruding end of said discharge tube at respective pivot points located on opposing sides of said tube and aligned with a center axis of said outer scoop, said outer scoop being adapted to pivot between a closed position, wherein the concave side of said outer scoop faces into and essentially closes the protruding end of said discharge tube, and a dispense position, wherein the concave side of said outer scoop faces out of and essentially closes the protruding end of said discharge tube.

28. A scoop dispensing as defined in claim 27 wherein said scoop dispensing means further comprises means for pivoting said outer scoop from said closed position to said dispensing position, said semisolid substance being forced up against the concave side of said outer scoop by said pressure means when in said closed position, and said semisolid substance being cut by a leading edge of said outer scoop as it pivots from said closed position to said dispensing position, whereby an essentially spherically-shaped scoop of said semisolid substance is carved out of the semisolid substance contained within said discharge tube.

29. A scoop dispensing apparatus as defined in claim 28 wherein said scoop dispensing means further includes scoop removal means for removing the scoop of semisolid substance from said outer scoop.

30. A scoop dispensing apparatus as defined in claim 26 wherein said semisolid substance comprises a food.

31. A scoop dispensing apparatus as defined in claim 30 wherein said food comprises a flavored frozen food, such as ice cream or sherbet.

32. A scoop dispensing apparatus as defined in claim 30 wherein said means for inserting said food into said closed container comprises a hinged door attached to a side of said closed container.

33. A scoop dispensing apparatus as defined in claim 32 wherein said means for inserting said frozen food into said closed container further comprises a drawer mechanism to which said closed container is mounted, said drawer mechanism being adapted to be pulled out of said freezer compartment, said hinged door of said closed container thereby becoming accessible from the outside of said freezer compartment.

34. A scoop dispensing apparatus as defined in claim 33 wherein said closed container has the same shape as a standard commercial container in which said frozen food is purchased, thereby permitting said commercial container to be directly placed into said closed container after removing opposite ends thereof.

35. An apparatus for dispensing a semisolid substance in scoops having a generally spherical shape and a uniform consistency, said apparatus comprising:

a closed container into which semisolid substance may be loaded;

pressure means for forcing said semisolid substance against a front wall of said closed container;

exit means for allowing said semisolid substance to exit through said front wall in response to said pressure means;

scoop dispensing means coupled to said exit means for forming said semisolid substance into a scoop having a generally spherical shape and a uniform consistency, and for delivering said spherical scoop to a user of said apparatus;

said semisolid substance comprising a food;

said pressure means comprising an air cylinder adapted to force a plunger rod therefrom with a force determined by the air pressure contained in said air cylinder, said plunger rod being connected to the movable end wall of said closed container, said movable end wall thereby comprising the plunger head of said air cylinder, and said movable end wall including at least one check valve, said check valve being adapted to close whenever said movable end wall is compressed against said semisolid substance by said pressure means, and to open, allowing air to pass from one side of the end wall to the other, whenever said end wall is pulled back away from said semisolid substance.

* * * * *